(12) United States Patent
Eckle (10) Patent No.: US 10,673,526 B2
(45) Date of Patent: Jun. 2, 2020

(54) CONDUCTOR LINE, CURRENT COLLECTOR, CONDUCTOR LINE SYSTEM, AND METHOD FOR CONTACTLESSLY TRANSMITTING DATA

(71) Applicant: Conductix-Wampfler GmbH, Weil am Rhein (DE)

(72) Inventor: Michael Eckle, Müllheim (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 0 days.

(21) Appl. No.: 16/329,814

(22) PCT Filed: Jul. 11, 2017

(86) PCT No.: PCT/EP2017/067320
§ 371 (c)(1),
(2) Date: Mar. 1, 2019

(87) PCT Pub. No.: WO2018/041453
PCT Pub. Date: Mar. 8, 2018

(65) Prior Publication Data
US 2019/0222314 A1    Jul. 18, 2019

(30) Foreign Application Priority Data
Sep. 1, 2016  (DE) .................. 10 2016 116 396

(51) Int. Cl.
*H04B 10/114* (2013.01)
*B60L 5/40* (2006.01)
(Continued)

(52) U.S. Cl.
CPC ............ *H04B 10/1149* (2013.01); *B60L 5/36* (2013.01); *B60L 5/40* (2013.01); *B61L 3/065* (2013.01); *H04B 10/22* (2013.01); *H04B 10/116* (2013.01)

(58) Field of Classification Search
CPC .. H04B 10/11–116; H04B 10/22; B61L 3/065
See application file for complete search history.

(56) References Cited

U.S. PATENT DOCUMENTS

| | | | |
|---|---|---|---|
| 6,361,330 B1 * | 3/2002 | Badcock | G02B 6/4246 361/807 |
| 6,762,382 B1 * | 7/2004 | Danelski | B07C 5/36 198/370.04 |

(Continued)

FOREIGN PATENT DOCUMENTS

| | | |
|---|---|---|
| DE | 10001873 A1 | 8/2001 |
| DE | 10 2004 020324 A1 | 3/2005 |

(Continued)

OTHER PUBLICATIONS

International Search Report dated Oct. 17, 2017, for PCT/EP2017/067320 filed Jul. 11, 2017.

(Continued)

*Primary Examiner* — Casey L Kretzer
(74) *Attorney, Agent, or Firm* — Paul D. Bianco; Gary S. Winer; Fleit Intellectual Property Law (57) ABSTRACT

A conductor line for supplying electric energy to an electric load which can be moved along the conductor line, includes at least one conductor strand, which runs in the longitudinal direction and comprises an electrically conducting profiled conductor section for contacting a sliding contact of the load; and a current collector for supplying electric energy to the load. The current collector has at least one sliding contact for contacting an electrically conductive profiled conductor section of a conductor strand. A first optical transmission unit which runs in the longitudinal direction is arranged on the conductor line for contactlessly transmitting data to a second optical transmission unit which is moveable relative to the conductor line, and a second optical transmission unit which is moveable in the longitudinal direction relative to (Continued)

the conductor line is arranged on the current collector for contactlessly transmitting data to a first optical transmission unit.

24 Claims, 4 Drawing Sheets

(51) Int. Cl.
*H04B 10/00* (2013.01)
*B61L 3/06* (2006.01)
*B60L 5/36* (2006.01)
*H04B 10/116* (2013.01)

(56) References Cited

U.S. PATENT DOCUMENTS

| | | | |
|---|---|---|---|
| 7,099,589 B1 * | 8/2006 | Hiramatsu | H04B 10/114 398/127 |
| 10,137,801 B2 | 11/2018 | Eckle et al. | |
| 2001/0053267 A1 | 12/2001 | Baur et al. | |
| 2005/0103591 A1 | 5/2005 | Micheau et al. | |
| 2007/0274727 A1 | 11/2007 | Haruyama et al. | |
| 2010/0232799 A1 * | 9/2010 | Lueck | H04B 10/1149 398/118 |
| 2013/0167751 A1 * | 7/2013 | Rosenwinkel | B61B 13/04 104/118 |

FOREIGN PATENT DOCUMENTS

| | | |
|---|---|---|
| DE | 102004008571 A1 | 10/2005 |
| DE | 10 2006 028288 A1 | 12/2007 |
| DE | 10 2011 119351 A1 | 10/2012 |
| DE | 10 2012 002085 A1 | 8/2013 |
| DE | 10 2014 107466 A1 | 12/2015 |
| EP | 1724952 A1 | 11/2006 |
| EP | 2056492 A1 | 5/2009 |
| WO | 03/022619 A1 | 3/2003 |

OTHER PUBLICATIONS

Written Opinion for PCT/EP2017/067320, filed Jul. 11, 2017.
Result of examination report for German Application No. 10 2016 116 396.1, filed Sep. 1, 2016.
International Preliminary Report on Patentability dated Mar. 5, 2019 with Written Opinion for PCT/EP2017/067320 filed Jul. 11, 2017.

* cited by examiner

Fig. 1

CONDUCTOR LINE, CURRENT COLLECTOR, CONDUCTOR LINE SYSTEM, AND METHOD FOR CONTACTLESSLY TRANSMITTING DATA

FIELD OF THE INVENTION

The invention relates to a conductor line, a current collector, a conductor line system and a method for contactlessly transmitting data.

BACKGROUND OF THE INVENTION

In known conductor line systems, a movable electrical load travels along a conductor line. To supply the load with electric energy, it is equipped with a current collector whose conductor contacts engage in conductor strands guided along the conductor line. The load, for example, can be lifting gear of an overhead track conveyor, a cable trolley movable on rails or also so-called E-RTG container cranes, which are equipped with an electric drive supplied with electrical power from the conductor line.

In order to be able to transmit data, for example, control data, to and from loads, slotted waveguides, guided parallel to the conductor strands of the conductor line, are used in known conductor line systems, in which antennas arranged on the load engage. DE 10 2014 107 466 A1 discloses such a conductor line system.

In some circumstances, the electrical processes occurring in the power-transmitting conductor strands have an adverse effect on RF transmission in the slotted waveguide. For example, if the sliding contacts of the current collector are briefly raised from the sliding contact surfaces of the conductor line, brief interruptions of direct current flow can occur and spark gaps are formed that can briefly generate pulses containing high-frequency components. Since the slotted waveguide and the grounding conductor strand form a common unit there, data transmission during bleeding off of current via the grounding conductor strand can also adversely affect data transmission.

Another problem in such conductor line systems with slotted waveguides for data transmission is that they are often used in areas with dirty and damp environments, for example, in container handling facilities in harbors.

DE 10 2011 119 351 A1 discloses a conductor line in which current-conducting conductor strands facing laterally outward are arranged with their openings on a double-T support. A slotted waveguide is also arranged there, whose longitudinal slot faces laterally outward; thus, dirt and especially rainwater can penetrate relatively easily into the longitudinal slot from the side and deposit especially on the lower horizontal slot surface.

The longitudinal slot in the slotted waveguide disclosed in DE 10 2012 002 085 A1 also faces to the side. To avoid penetration of rainwater into the longitudinal slot obliquely from the top, a deflection part bent twice by 45° is provided there on the upper wall of the longitudinal slot, so that the opening of the longitudinal slot is directed vertically downward after the deflection part. The antenna of the rail vehicle then engages vertically into the longitudinal slot from below, so that the electromagnetic waves must be deflected from the T-shaped cavity profile of the slotted waveguide downward to the longitudinal slot by means of the deflection part. This is a drawback for data transmission owing to the asymmetry of the angled longitudinal slot and the longer transmission path of the waves in contrast to a straight longitudinal slot.

Penetration of rainwater is avoided in the conductor line system of DE 10 2004 008 571 A1 with support rails designed as double-T supports with conductor strands arranged laterally on them, so that the slotted waveguide is arranged in the foot part of the double-T support and the longitudinal slot of the slotted waveguide discharges vertically downward. Dirt adhering to the antenna and dirt swirled up from below, as is the case especially in the area of E-RTG container cranes, however, penetrates unhindered through the longitudinal slot into the slotted waveguide. Since such E-RTG container cranes are preferably used in harbors with humid, saline air, the rising moisture also penetrates unhindered into the slotted waveguide and leads to rapid corrosion there of both the slotted waveguide and the movable antennas that can be introduced into the slotted waveguide.

EP 1 724 952 A1 concerns a communication system that provides high-speed and high-quality communication in an elongated communications area and implements leaky optical fibers. The optical fiber is then of the GI type with a core that is structured so that the refractive index is high at the center, diminishes gradually as it approaches the periphery and can have scatterers mixed therein. When modulated light from a transmitter enters the optical fiber, the modulated light passes through the optical fiber, whereas part of the light emerges from the side. A receiver receives this leakage light and demodulates it in order to obtain data.

DE 10 2004 020 324 A1 discloses an optical method and an optical device for monitoring of an electrical conductor, in which an optical sensor is arranged on or in a component of the conductor and a light signal fed into the optical sensor is changed based on a physical quantity at the location of the optical sensor. A measured value for the physical quantity is determined from the deformation-related change of the light signal.

EP 2 056 492 A1 discloses a mobile optical communication system comprising a railway and a train. Several leaky optical fibers, a number of optical fibers and a number of light receivers are arranged along the rail path. The leaky optical fiber contains transparent parts. The nontransparent parts are arranged discontinuously along the longitudinal direction and are arranged at intervals that are smaller or equal to a length of the train with reference to a travel direction of the train. Several light receivers arranged on the train are arranged along the entire length of the train in the travel direction in intervals smaller than or equal to a fixed length. Two adjacent light transmitters that are arranged on the train are arranged so that optical images from two light transmitters adjacent to the optical fiber have an overlapping area with reference to the travel direction.

A shortcoming in the conductor line systems just described, among other things, is the sensitivity of the known contactless radio data transmission relative to electrical incidents on the power-transmitting conductor lines, disturbances from other radio connections and the sensitivity relative to a corrosive environment.

SUMMARY OF THE INVENTION

One aspect of the disclosure relates therefore to a conductor line, a current collector, a conductor line system, as well as a method for contactless data transmission, which overcome the drawbacks just mentioned and permit simple and secure, extremely reliable data transmission insensitive to external effects with high transmission volume as low-disturbance or disturbance-free as possible.

Advantageous developments and refinements of the invention are also disclosed.

A conductor line mentioned in the introduction is characterized according to the invention by the fact that a first optical transmission unit running in the longitudinal direction on the conductor line is arranged for contactless data transmission with a second optical transmission unit movable relative to the conductor line.

The first optical transmission unit can then have a number of optical transmitters and/or receivers in the longitudinal direction for data transmission with at least one optical receiver or transmitter of the second optical transmission unit. In an advantageous modification the optical transmitters or receivers of the first optical transmission unit can be set up to emit light signals in the longitudinal direction or to receive them at least partially in the longitudinal direction.

In another implementation of the invention, the first optical transmission unit can be designed in the form of a strip.

Alternatively or additionally, at least some of the optical transmitters or receivers of the first optical transmission unit can be arranged in the longitudinal direction spaced apart from each other at a stipulated maximum spacing.

A mount to accommodate the first optical transmission unit can also be arranged on the conductor line. In this respect, the first optical transmission unit need not be arranged in or directly against the conductor line or its conductor strands but can also be guided parallel to the conductor line as an independent module. With particular advantage, the first optical transmission unit can be arranged in a housing running along the conductor line, which can also be subsequently retrofitted. The fact that it runs in the longitudinal direction along the conductor line is relevant for the spatial arrangement of the first optical transmission unit relative to the conductor line.

In an advantageous development, the conductor line can be designed as an elongated hollow profile with a cavity running in the longitudinal direction and a longitudinal slot running in the longitudinal direction, in which case the first optical transmission unit can then advantageously be arranged in the cavity.

In a modification that is favorable in terms of installation, the conductor line can be an enclosed conductor line and the first optical transmission unit can be arranged in a mount provided for an electrical sliding contact. For this purpose, no extra mount need be provided for the first optical transmission unit, which is particularly useful during retrofitting of existing enclosed conductor lines. The first optical transmission unit can then also be designed accordingly so that it can be used in already existing mounts of other elements in other conductor line types.

A current collector mentioned in the introduction is characterized according to the invention in that a second optical transmission unit movable relative to the conductor line in the longitudinal direction is arranged for contactless data transmission with a first optical transmission unit arranged on the conductor line.

The second optical transmission unit can then have at least one optical transmitter and/or receiver for data transmission with at least one optical receiver or transmitter of the first optical transmission unit. The at least one optical transmitter and/or receiver of the second optical transmission unit can advantageously be set up to emit light signals in the longitudinal direction or to receive them at least partially in the longitudinal direction.

The transmitters in the conductor line and/or current collector described above and further below can advantageously have a light source, especially an infrared light source. The light source can then be set up to emit high-frequency light pulses and the receiver set up to receive these light pulses. The optical data signals emitted from the optical transmitters of the first optical transmission unit can also be advantageously distinguishable from the optical data signals emitted by the optical transmitters of the second optical transmission unit, especially by different frequencies of the light pulses. The first optical transmission unit and the second optical transmission unit can advantageously be connected to a controller.

A conductor line system mentioned in the introduction is characterized according to the invention in that a first optical transmission unit running in the longitudinal direction is arranged along the conductor line and a second optical transmission unit movable relative to the conductor line with the load is provided in the longitudinal direction. The conductor line can then advantageously be designed as described above and further below and/or the second optical transmission unit can be arranged on a current collector of the load described as above and further below. In particular, the optical transmitter or receiver of the first optical transmission unit and the optical receiver or transmitter of the second optical transmission unit can be advantageously directed toward each other.

A method mentioned in the introduction for contactless data transmission in a conductor line system as described above and further below is characterized by the fact that the optical transmitters of the first optical transmission unit emit an optical data signal.

The optical data signal emitted by the optical transmitters of the first optical transmission unit can be advantageously distinguishable from the optical data signals emitted by the optical transmitters of the second optical transmission unit. The optical transmitters of the first optical transmission unit can preferably all emit the same optical data signal.

In a favorable refinement, the data signal can be emitted from a first optical transmitter of the first optical transmission unit, then received by a first optical receiver of the first optical transmission unit arranged in the longitudinal direction at a spacing relative to it, then the received optical data signal can be conveyed electrically or optically to a second optical transmitter of the first optical transmission unit arranged in the longitudinal direction at a spacing from the first optical transmitter and then the optical data signal emitted by the second optical transmitter. The optical data signal emitted by the first optical transmitter of the first optical transmission unit can then be advantageously received by an optical receiver of the movable second optical transmission unit and an optical transmitter of the movable second optical transmission unit can emit the optical data signal again preferably in the travel direction. In particular, the data signal between the first optical receiver and the second optical receiver of the first optical transmission unit and/or between the optical receiver and the optical transmitter of the movable optical transmission unit can be amplified.

BRIEF DESCRIPTION OF THE DRAWINGS

The invention is described below by means of detailed embodiment examples with reference to the accompanying drawings. In the drawings.

DETAILED DESCRIPTION OF THE INVENTION

Figure 1:
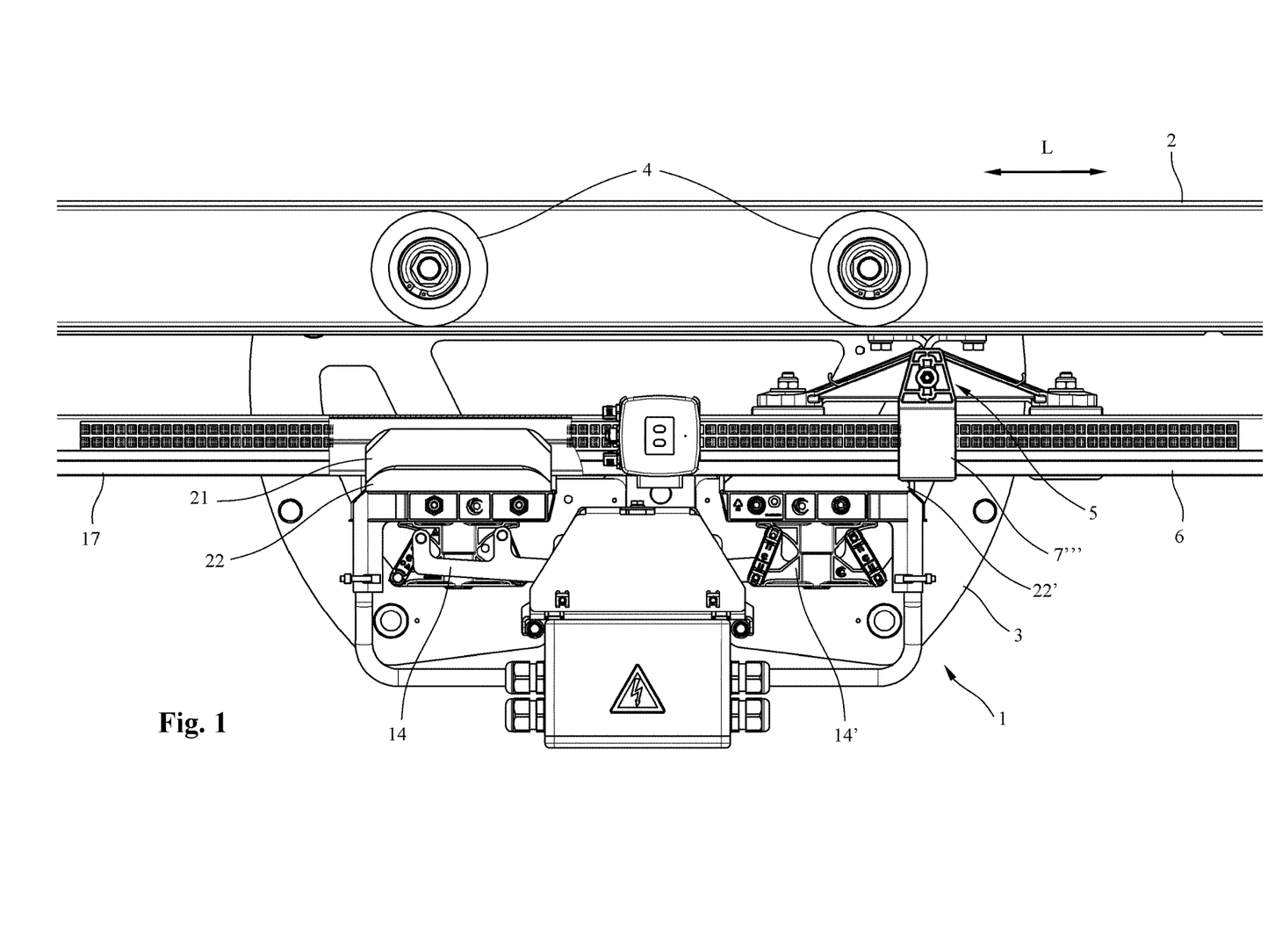
FIG. 1 shows a side top view of a section of a conductor line system according to the invention.

FIG. 1 shows a lateral top view of a section of a conductor line system 1 according to the invention, whose structure is essentially identical to the conductor line system described in DE 10 2014 107 466 A1. To this extent, the disclosure contents of DE 10 2014 107 466 A1, as well as its FIGS. 1, 2 and 2a and the corresponding description are made an object of the present application.

The conductor line system 1 has an essentially double U-shaped rail line 2. A current collector 3 of an electrical load (not shown) is movable in a longitudinal direction L with rollers 4 on rail line 2. The current collector 3 serves to supply the electrical consumer, for example, a container crane movable along rail line 2.

On the bottom side of rail line 2, a conductor line 6 according to the invention is mounted suspended downward by means of conductor line mounts 5 positioned at a spacing from each other in the longitudinal direction L of rail line 2. The conductor line 6 then has three conductor strand mounts 7, 7', 7" arranged next to each other, readily apparent in FIGS. 2 to 5, to hold the elongated phase conductor strands 8, 8' and 8". Since the phase conductor strands 8' and 8" are identical to the phase conductor strand 8, the comments made relative to phase conductor strand 8 apply accordingly.

The phase conductor strand 8 has an elongated insulation profile 9, which is held by the conductor strand mount 7. An elongated, electrically conductive phase conductor profile 10 with also electrically conductive elongated sliding surface 11, preferably made of aluminum or steel, is again used in insulation profile 9.

A sliding contact 12, which is arranged on a sliding contact support 13 of current collector 3, slides on sliding surface 11. A sliding contact support 13 with sliding contact 12 can be moved in a known manner via a known feed mechanism 14 shown as an example in FIG. 1 toward and away from the sliding surface 11. During operation, the sliding contact 12 is continuously forced against the sliding surface 11, for example, via spring force. Additional sliding contacts 12' and 12" depicted in FIG. 2 with corresponding sliding contact supports are essentially identical to sliding contact 12 and sliding contact support 13; thus, the comments made in this respect apply accordingly. In particular, each sliding contact 12, 12' and 12" has its own feed mechanism 14.

The phase conductor strand 8 serves for supplying power to the movable load and during normal operation is under voltage, so that current flows to the sliding contact 12 via sliding surface 11. The design described above is known in principle to one skilled in the art and requires no further comment.

A grounding conductor strand 15 for connection of the movable electrical load to ground potential of the conductor line system 1 is also usually provided in such a conductor line system 1. The grounding conductor strand 15 is described further below primarily with reference to the detail drawing of FIG. 3.

Figures 2, 3:
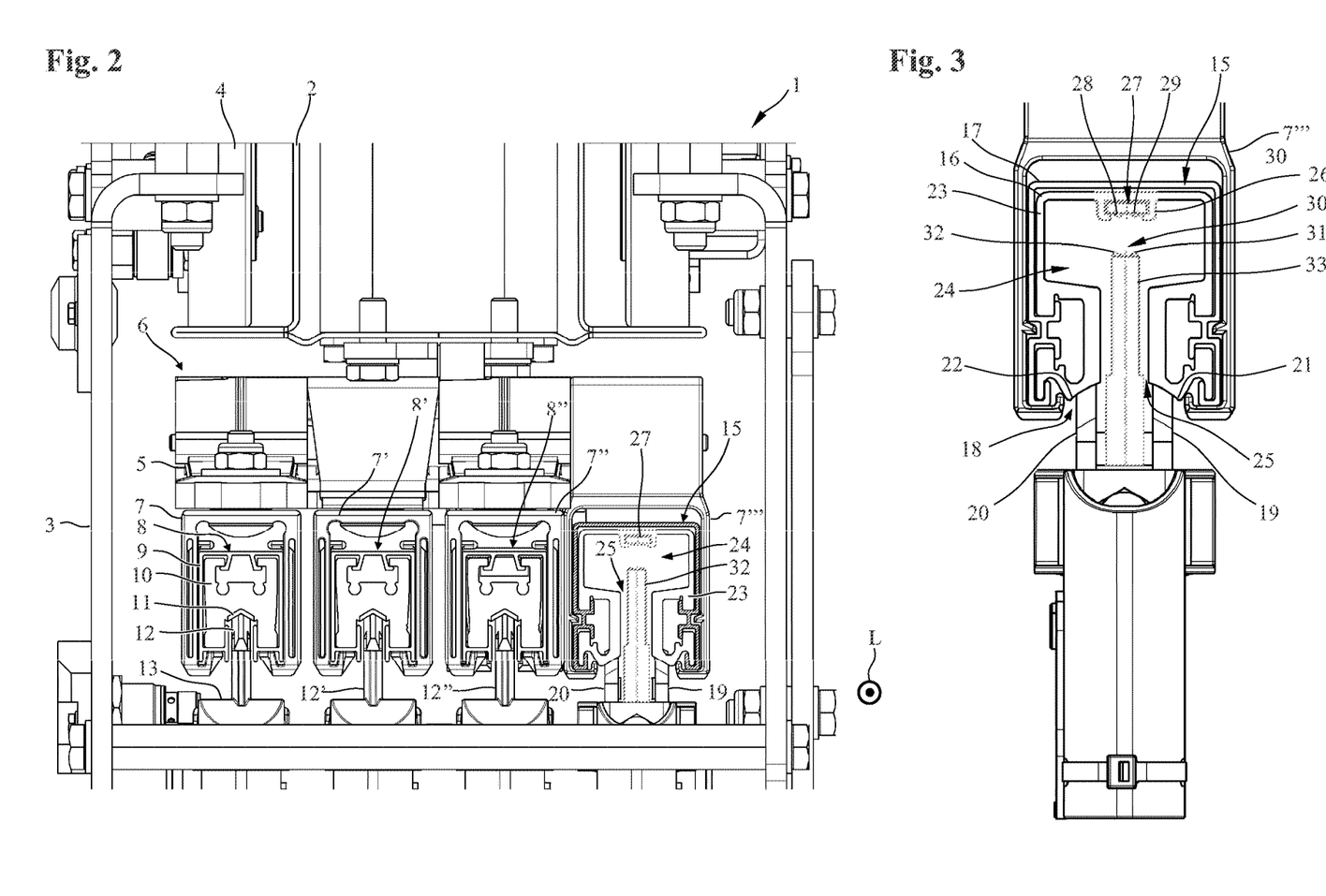
FIG. 2 shows a front sectional top view of the conductor line system from FIG. 1.
FIG. 3 shows a detail view from FIG. 2.

The grounding conductor strand 15 has an electrically conducting grounding conductor profile 16 for this purpose, which is enclosed by an essentially U-shaped grounding insulation profile 17 with a downward open contact opening 18 in FIG. 3. The grounding conductor strand 15 is fastened with a conductor strand mount 7m, like the phase conductor strands 8, 8', 8" to the conductor line 6. As is apparent in FIGS. 1 to 3, a right grounding sliding contact 19 or a left grounding sliding contact 20, as well as antenna 21 electrically insulated from grounding sliding contacts 19, 20 arranged between them, is provided on current collector 3. The grounding sliding contacts 19, 20 can be raised by a feed mechanism 14 and in so doing brought into contact and kept in contact with corresponding grounding sliding contact surfaces 21 and 22 of grounding conductor profile 16, as already described above.

The grounding conductor profile 16 is then designed as an essentially T-shaped hollow profile 23 with a cavity 24 that merges into a right or left slot wall of a downward open longitudinal slot 25. The longitudinal slot 25 then points in the same direction as the downward open contact opening 18.

A mount 26 is also provided on the upper wall of hollow profile 23 opposite the longitudinal slot 25, into which a fixed optical transmission unit 27 on the line side is inserted as an LED strip. The mount 26 can then be continuous in longitudinal direction L or also only hold the optical transmission unit 27 in places in the position depicted in FIG. 3. The strip-like transmission unit 27 can then be preferably designed to be somewhat flexible but still shape-stable in order to be simply pushed, pulled or clipped into mount 26.

For optical transmission between conductor line 6 and the movable load, the optical transmission unit 27 on the conductor line side has fixed optical transmitters 28 designed as light-emitting diodes and optical receivers 29 designed as photodiodes, which cooperate with optical receivers 32 and optical sensors 31 on the load side of an optical transmission unit 30 movable along conductor line 6 in longitudinal direction L on the load side arranged on support 33 movable with the load. Instead of diodes, however, other appropriate optical transmitters and receivers, especially light sources and receivers, preferably for infrared or visible light, can also be used. The support 33 on the load side aligned in longitudinal direction L engages for this purpose through longitudinal slot 25 in cavity 24 and can be advantageously raised via feed mechanism 14, as already described above.

Data transmission then occurs optically, for example, via the known Li-Fi [Light Fidelity] network technology or Visual Light Communication (VLC), in which high-frequency light or light with a high-frequency component transmits data at a high transmission rate. For this purpose, the optical transmitters 28, 31 must be suitable for emitting such a light data signal to the optical receivers 29 and 32 suitable for receiving these light data signals. The specific embodiment is known to one skilled in the art.

The optical transmission units 27, 30 are also connected in known fashion to corresponding control devices that supply the data to the corresponding transmitting optical transmission unit or receive data from the corresponding receiving optical transmission unit and also optionally control the optical transmission units 27, 30. Conversion and processing of the data for optical transmission can then occur as light data signals in the control devices or optionally also occur via electronic control integrated in the optical transmission units 27, 30.

The transmitters 28, 31 and receivers 29, 32 are preferably aligned as well as possible with each other, so that the light data signals can be transmitted over the shortest, most direct and most unobstructed path as possible. For this purpose, the transmitters 28, 31 point with their main beam direction in the direction of receivers 29, 32.

In principle, it is already sufficient if an optical transmitter 31 and an optical receiver 32 are arranged on the movable support 33. In order to increase failure safety, however, several optical transmitters 31 and optical receivers 32 can also be preferably arranged there.

In addition, the hollow profile 23 can then advantageously serve, on the one hand, for shielding of optical data transmission relative to an influence from other light sources coming from the outside and, in the second place, to shield the transmitted data from the outside in order to prevent reading of the data. The hollow profile can then preferably consist of a material insensitive to corrosion, especially plastic. Reliable and secure data transmission in terms of data security is therefore obtained, since no noticeable de facto radiation outwardly occurs.

Since during normal operation no electrical power is transmitted via the grounding sliding contacts 21, 22, there is already no risk of arcing over between grounding conductor profile 16 and grounding sliding contacts 21, 22, which can adversely affect data transmission by means of optical transmission unit 27 on the conductor side and transmission unit 28 on the load side. However, even if current flow to the grounding conductor strand with possible arcing over were to occur, this would not adversely affect optical data transmission.

The grounding conductor profile 16 and the hollow profile 23 are made in one piece from the same material and therefore form a unit so that manufacture and installation can be simplified. However, grounding conductor profile 16 and hollow profile 23 can also be made from separate parts and/or different materials. The hollow profile 23 can also have a different suitable cross section.

Figure 4:
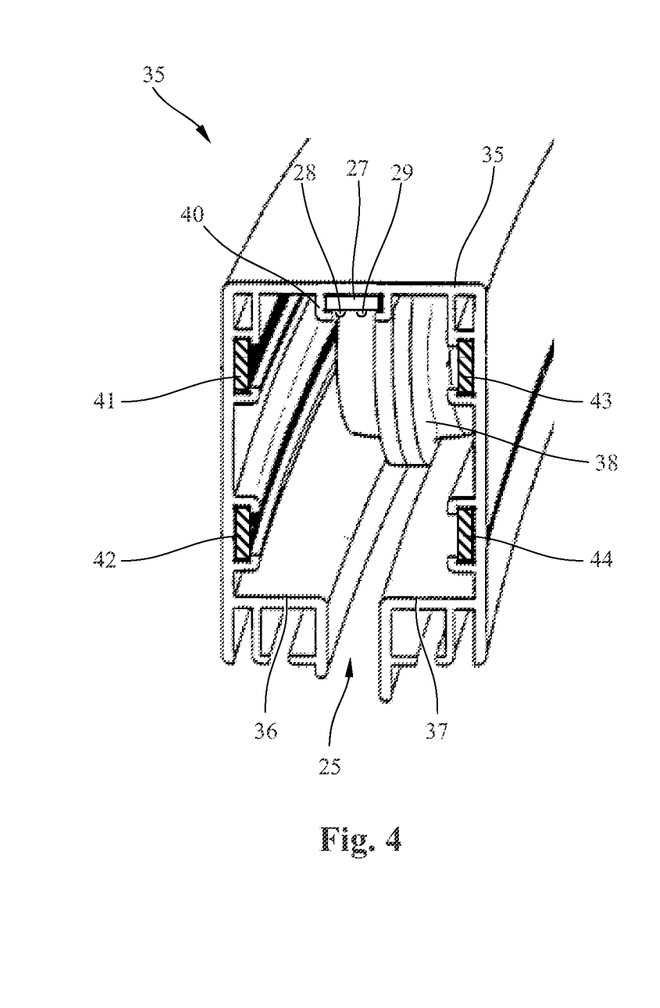
FIG. 4 shows a frontal top view of an alternative embodiment of a conductor line system according to the invention.
Figure 5:
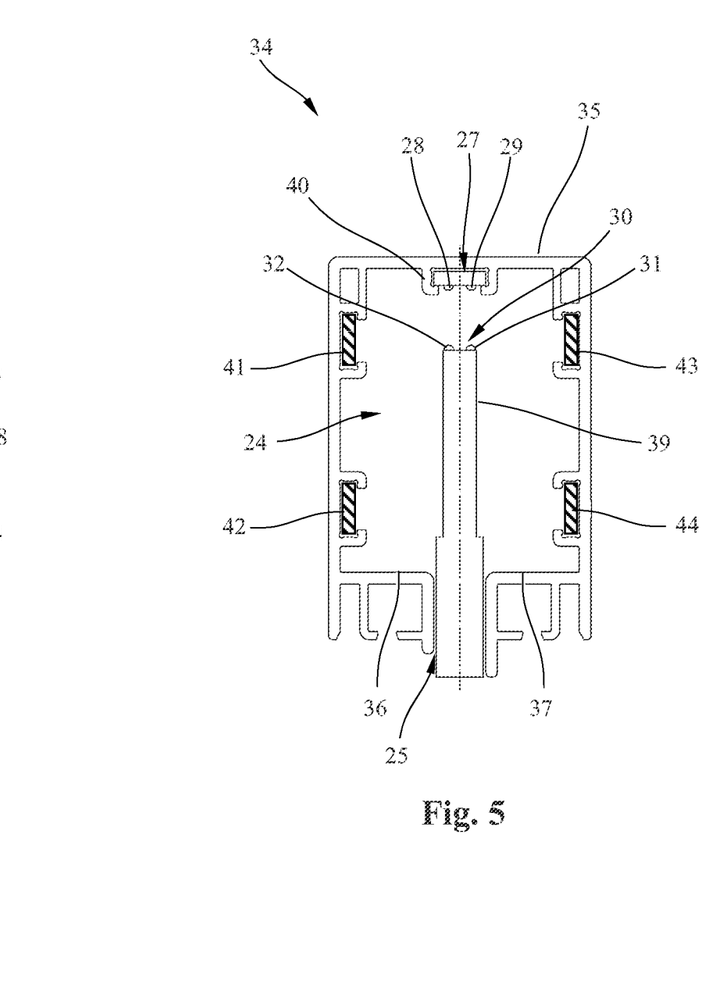
FIG. 5 shows a cross section through the conductor line system from FIG. 4.

FIGS. 4 and 5 show a frontal top view as well as a cross section of an alternative embodiment of a conductor line system 34 according to the invention based on an enclosed conductor line 35 known from DE 296 02 589 U1. For simpler description, the same or corresponding parts from the first embodiment example according to FIGS. 1 to 3 are marked further below with the same reference numbers and designations. The above comments then apply accordingly, if transferable.

The enclosed conductor line 35 is formed from a hollow profile of an insulating material, especially plastic. A current collector trolley 39 only indicated in FIG. 5, mounted on rollers 38 travels on its running surfaces 36, 37 in known fashion. As schematically shown in FIG. 5, part of the current collector trolley 39 then extends through a longitudinal slot 25 of the enclosed conductor line 35. Ordinarily the power supply lines are passed to the load through the longitudinal slot 25.

The hollow profile of the conductor line 35 has mounts 40 on the inside to accommodate conductor rails 41 to 44 forming sliding contacts, where in FIG. 5 only the mount 40 situated on the upper cover wall of the enclosed conductor line 35 is provided with its own reference number.

However, in the upper mount 40 no conductor rail is used, but instead a fixed optical transmission unit 27 with optical transmitter 28 and receivers 29 arranged thereon, as described above. The optical transmission unit 30 with its optical transmitter 31 and receiver 32 again serves as counter element, which is arranged on the upper end of the current collector trolley 39 facing the fixed optical transmission unit 27.

Figure 6:
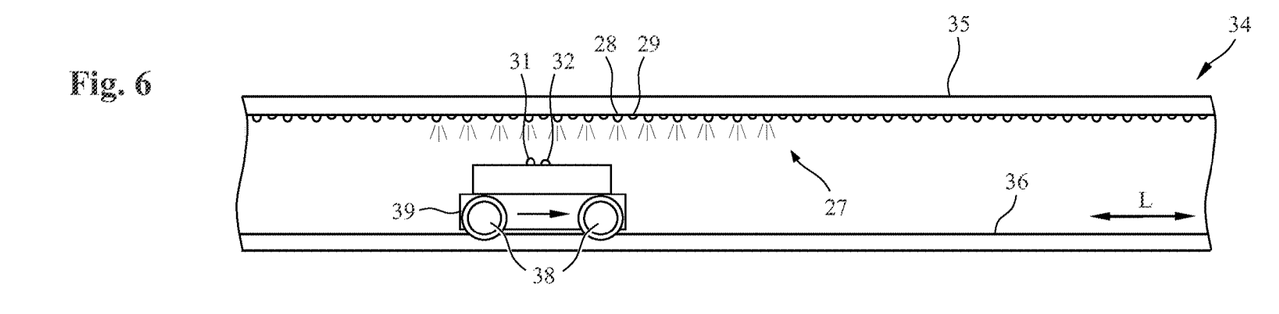
FIG. 6 shows a cross section in the longitudinal direction through a schematic depiction of the conductor line system from FIG. 4.
Figure 7:
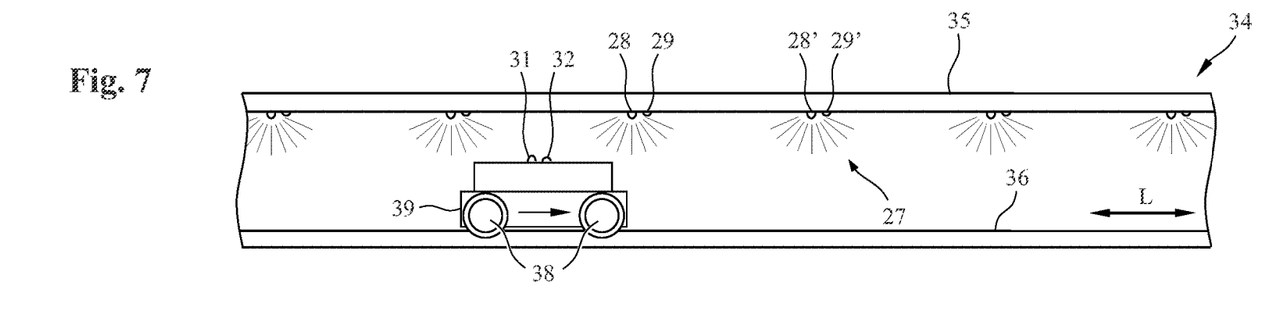
FIG. 7 shows the cross section from FIG. 6 with an alternative embodiment of the invention.
Figure 8:
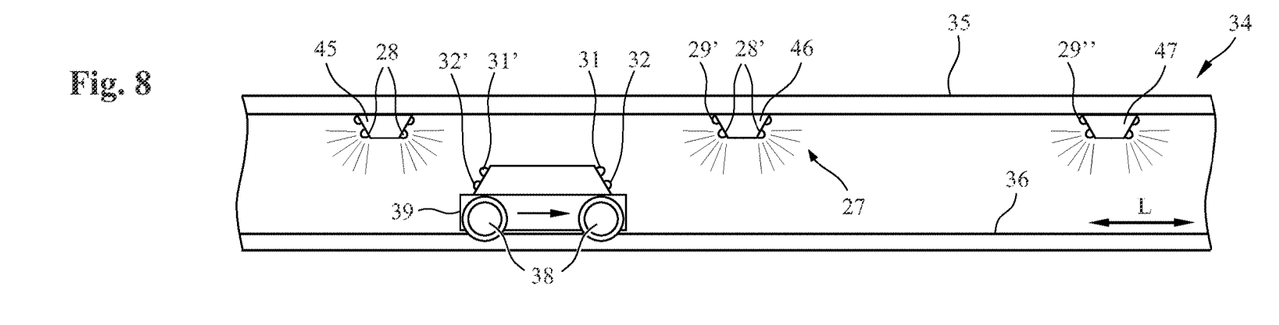
FIG. 8 shows the cross section from FIG. 6 with another alternative embodiment of the invention.

FIGS. 6 to 8 show fully schematic different embodiments of the invention by means of a cross section running in the longitudinal direction through the conductor line system for FIGS. 4 and 5, but the described embodiments can also be easily used in the embodiment example depicted in FIGS. 1 to 3.

The embodiment in FIG. 6 again shows the fixed optical transmission unit 27 in the form of an LED strip. The optical transmitters 28 and optical receivers 29 then alternate, in which only one transmitter 28 and receiver 29 are marked with reference numbers here for reasons of simpler depiction. The current collector trolley 39 travels in the travel direction indicated by the arrow, i.e., in longitudinal direction L of enclosed conductor line 35. The optical transmitters 28 then only transmit in an area above and somewhat ahead of the current collector trolley 39 so that energy can be saved, since it need not be transmitted in the untraveled sections. However, all transmitters 28 can transmit just as readily so that control of the fixed first optical transmission unit 27 can be simplified, since it need not be tracked where the current collector trolley 39 is precisely situated.

In this embodiment example all transmitters 28 transmit the same optical data signal at the same time in order to make sure that a distinct data signal can always be received in the receiver 32 of the current collector trolley 39.

A continuous LED strip is not provided as first optical transmission unit 27 in the alternative embodiment of the invention depicted in FIG. 7. Instead, pairs of optical transmitters 28 and receivers 29 of the first optical transmission unit 27 are arranged at a stipulated spacing from the next transmitter-receiver pair 28', 29'. The spacing is then chosen so that reliable data transmission is ensured, i.e., that optical data signals transmitted from the first and second transmitter-receiver pairs preferably overlap.

In an advantageous modification, the transmitters 28 and receivers 29 can also be arranged not next to each other, but also at a spacing. In the embodiment depicted in FIG. 7 the receivers 29, 29' would then be advantageously arranged, if possible, in the center between transmitters 28, 28'. An adverse effect of an optical data signal sent from the optical transmitter 31 of the current collector trolley 39 by the optical data signals emitted from the optical transmitters 28, 28' could therefore be reduced, since the optical data signals are weakest in the region between optical transmitters 28, 28'.

An alternative embodiment can prescribe that the distinctions between the optical data signal sent by the fixed optical transmitter 28 and the optical data signal sent by the optical transmitter 31 of the current collector trolley 39 occur in that the two transmitters 28, 31 transmit with optical data signals of different frequency.

The alternative embodiment depicted in FIG. 8 proposes according to the variant depicted in FIG. 7 that pairs of optical transmitters 28 and optical receivers 29 are each arranged at a spacing from the next ones 28', 29'. The pairs are also additionally arranged on oblique mounts 45, 46 and 47 and emit obliquely downward into the enclosed conductor line 35. Accordingly, the optical transmitters 31 and receivers 32 of the second movable optical transmission unit 30 on current collector trolley 39 are directly obliquely upward. In addition, the optical transmitters 28, 28', 31, 31' and receivers 29, 29', 32, 32' are then arranged both on the mounts 45 to 47 and on the current collector trolley 39 in and against the travel direction. Because of this, the optical data signals of the optical transmitters 28, 28' and 31, 31' can advantageously be emitted in the direction of the corresponding optical receivers 32, 32' and 29, 29'.

This embodiment also proposes that the middle pair of optical transmitters 28' and receiver 29' in FIG. 8 is not connected to the control of the conductor line system 34 but only operates as a so-called repeater. This means that the data signal need be fed by the control, for example, only on the first mount 45 from which the first optical transmitter 28 of the first optical transmission unit 27 sends the data signal both to optical receiver 32' of the current collector trolley 39 and to the optical receiver 29' of the mount 46 following in the travel direction. There the optical data signal is preferably amplified by an amplifier and then emitted via the optical transmitter 28'. Because of this the cabling and connection expense can be simplified, since not every optical transmitter 28' has to be connected to its own control along conductor line 34. This is especially helpful when the conductor line 34 is poorly accessible at certain locations. The optical data signal can also be optionally further conveyed via several distributed optical transmitters, so that only relatively few feed sites need be provided. Electrical power supply of the transmitter 28' serving as repeater can then occur relatively simply in direct fashion via the current-conducting conductor rails 41 to 44 contained in the enclosed conductor line.

For the case of only unidirectional signal transmission no receivers are naturally necessary on the transmitter side, whereas no transmitters are necessary on the receiver side. However, if both transmitters and receivers are present on both sides, bidirectional data transmission can advantageously occur.

REFERENCE NUMBERS

1 Conductor line system
2 Rail line
3 Current collector
4 Rollers
5 Conductor line mounts
6 Conductor line
7, 7', 7" Conductor strand mounts
8, 8', 8" Phase conductor strands
9 Insulation profile
10 Phase conductor profile
11 Sliding surface phase conductor strand
12, 12', 12" Sliding contact
13 Sliding contact support
14 Feed mechanism
15 Grounding conductor strand
16 Grounding conductor profile
17 Grounding insulation profile
18 Contact opening grounding insulation profile
19 Right grounding sliding contact
20 Left grounding sliding contact
21 Right grounding sliding contact surface
22 Left grounding sliding contact surface
23 Hollow profile
24 Cavity
25 Longitudinal slot
26 Mount for fixed optical transmission unit
27 Fixed optical transmission unit
28, 28' Optical transmitter on conductor line side
29, 29', 29" Optical receiver on conductor line side
30 Load side of movable optical transmission unit on load side
31, 31' Optical transmitter on load side
32, 32' Optical receiver on load side
33 Trolley support for transmission unit on trolley side
34 Alternative conductor line system
35 Enclosed conductor line
36, 37 Running surfaces
38 Rollers
39 Current collector trolley
40 Mounts for conductor rails
41-44 Conductor rails
45-47 Oblique mounts for transmitters and receivers on conductor line side
I Longitudinal direction conductor line

The invention claimed is:

1. A conductor line to supply electrical power to at least one electrical load movable on the conductor line in a longitudinal direction of the conductor line, with at least one conductor strand running in the longitudinal direction with an electrically conducting conductor profile for contacting with a sliding contact of the at least one electrical load, wherein a first optical transmission unit running in the longitudinal direction is arranged on the conductor line for contactless data transmission with a second optical transmission unit movable relative to the conductor line, wherein the conductor line is designed as an elongated hollow profile with a cavity running in the longitudinal direction and a longitudinal slot running in the longitudinal direction, and wherein the first optical transmission unit is arranged in the cavity.

2. The conductor line according to claim 1, wherein the first optical transmission unit has a number of optical transmitters and/or receivers in the longitudinal direction for data transmission with at least one optical receiver or transmitter on the second optical transmission unit.

3. The conductor line according to claim 2, wherein the number of optical transmitters and/or receivers of the first optical transmission unit are set up to emit light signals in the longitudinal direction or to receive light signals at least partially in the longitudinal direction.

4. The conductor line according to claim 1, wherein the first optical transmission unit is designed in the form of a strip.

5. The conductor line according to claim 1, wherein the first optical transmission unit has a plurality of optical transmitters or receivers and wherein at least some of the plurality of optical transmitters or receivers are arranged in the longitudinal direction separated by a stipulated maximum spacing from each other.

6. The conductor line according to claim 1, wherein a mount to accommodate the first optical transmission unit is arranged on the conductor line.

7. The conductor line according to claim 1, wherein the first optical transmission unit is arranged in a housing running along the conductor line.

8. The conductor line according to claim 1, wherein the conductor line is an enclosed conductor line and the first optical transmission unit is arranged in a mount provided for an electrical sliding contact.

9. The conductor line according to claim 1, wherein the first optical transmission unit has a light source.

10. The conductor line according to claim 9, wherein the light source is set up to emit high-frequency optical signal pulses.

11. The conductor line according to claim 9 wherein the first optical transmission unit and the second optical transmission unit are each connected to a controller.

12. A conductor line system comprising:
the conductor line according to claim 1; and
a current collector to supply electrical power to the at least one electrical load,
wherein the second optical transmission unit is arranged on a support of the current collector for the contactless data transmission with the first optical transmission unit.

13. The conductor line system according to claim 12, wherein the first optical transmission unit has a plurality of optical transmitters or receivers and the second optical transmission unit has a plurality of optical receivers and transmitters and wherein the plurality of optical transmitters or receivers of the first optical transmission unit and the plurality of optical transmitters or receivers of the second optical transmission unit are aligned with each other.

14. The conductor line according to claim 1, wherein the second optical transmission unit is arranged on the current collector.

15. The conductor line according to claim 1, wherein the second optical transmission unit is arranged on a support of the current collector.

16. A current collector to supply electrical power to at least one electrical load movable in a longitudinal direction on a conductor line, in which the current collector has at least one sliding contact for contacting with an electrically conductive conductor profile of a conductor strand of the conductor line, wherein a second optical transmission unit movable in the longitudinal direction relative to conductor line is arranged on a support of the current collector for contactless data transmission with a first optical transmission unit arranged on the conductor line, and wherein in operation of the current collector the support is disposed inside a longitudinal slot in a cavity of the conductor line.

17. The current collector according to claim 16, wherein the second optical transmission unit has at least one optical transmitter and/or receiver for data transmission with at least one optical receiver or transmitter of the first optical transmission unit.

18. The current collector according to claim 17, wherein the at least one optical transmitter and/or receiver of the second optical transmission unit is set up to emit light signals in the longitudinal direction or to receive light signals at least partially in the longitudinal direction.

19. A method for contactless data transmission in a conductor line system comprising a conductor line to supply electrical energy to at least one electrical load movable on the conductor line in a longitudinal direction, with at least one conductor strand running in the longitudinal direction with an electrically conductive conductor profile for contacting with a sliding contact of the load, a first optical transmission unit running in the longitudinal direction arranged along the conductor line, and a second optical transmission unit movable with the at least one electrical load relative to the conductor line in the longitudinal direction, the method comprising:
using optical transmitters of the first optical transmission unit to emit an optical data signal,
wherein the optical data signal is emitted by a first optical transmitter of the first optical transmission unit, is then received by a first optical receiver of the first optical transmission unit arranged at a spacing from the first optical transmitter in the longitudinal direction, then the received optical data signal is electrically or optically conveyed further to a second optical transmitter of the first optical transmission unit arranged in a spacing from the first optical transmitter in the longitudinal direction and then the optical data signal is emitted by the second optical transmitter.

20. The method according to claim 19, wherein the optical data signal emitted by the optical transmitters of the first optical transmission unit is distinguishable from an optical data signal emitted by optical transmitters of the second optical transmission unit.

21. The method according to claim 19, wherein the optical transmitters of the first optical transmission unit all emit the same optical data signal.

22. The method according to claim 19, wherein the optical data signal emitted by the first optical transmitter of the first optical transmission unit is received by an optical receiver of the movable second optical transmission unit, and wherein an optical transmitter of the movable second optical transmission unit emits the optical data signal again.

23. The method according to claim 22, wherein the optical data signal is amplified between the first optical receiver and the second optical transmitter of the first optical transmission unit and/or between the optical receiver and the optical transmitter of the movable second optical transmission unit.

24. A current collector to supply electrical power to at least one electrical load movable in a longitudinal direction on a conductor line, in which the current collector has at least one sliding contact for contacting with an electrically conductive conductor profile of a conductor strand of the conductor line, wherein a second optical transmission unit movable in the longitudinal direction relative to conductor line is arranged on the current collector for contactless data transmission with a first optical transmission unit arranged on the conductor line, and wherein in operation of the current collector the second optical transmission unit is disposed inside a longitudinal slot in a cavity of the conductor line.

* * * * *